US008612455B2

(12) United States Patent
Sa'adon et al.

(10) Patent No.: US 8,612,455 B2
(45) Date of Patent: Dec. 17, 2013

(54) SYSTEM AND METHOD FOR DETECTING PERSONAL EXPERIENCE EVENT REPORTS FROM USER GENERATED INTERNET CONTENT

(75) Inventors: Roee Robert Sa'adon, Yavne (IL); Tsvi Rabkin, Zichron Yaakov (IL); Michael Palei, Modi'in (IL); Idan Amit, Ramat Gan. (IL); Itzchak Lichtenfeld, Givaat Shmuel (IL); Assaf Yardeni, Kiryat Ono (IL); Michael Milman, Kiryat Motzkin (IL)

(73) Assignee: Treato Ltd., Yehud (IL)

( * ) Notice: Subject to any disclaimer, the term of this patent is extended or adjusted under 35 U.S.C. 154(b) by 86 days.

(21) Appl. No.: 13/253,090

(22) Filed: Oct. 5, 2011

(65) Prior Publication Data

US 2012/0089616 A1 Apr. 12, 2012

Related U.S. Application Data

(60) Provisional application No. 61/390,220, filed on Oct. 6, 2010, provisional application No. 61/390,215, filed on Oct. 6, 2010.

(51) Int. Cl.
*G06F 17/30* (2006.01)

(52) U.S. Cl.
USPC .......................................... 707/748; 707/754

(58) Field of Classification Search
USPC ........................................................... 707/748
See application file for complete search history.

(56) References Cited

U.S. PATENT DOCUMENTS

2010/0070448 A1* 3/2010 Omoigui ........................ 706/47

* cited by examiner

*Primary Examiner* — Neveen Abel Jalil
*Assistant Examiner* — Jagdish Pandya
(74) *Attorney, Agent, or Firm* — Eitan, Mehulal & Sadot

(57) ABSTRACT

A method for retrieving Internet posts, implementable on a computing device, includes analyzing Internet posts to define segments in the Internet posts, where the segments at least contain terms consistent with user generation of a personal experience event report associated with a pre-defined search subject, and scoring each of the segments, where the score indicates a likelihood that the Internet post associated with the segment represents a user generated the personal experience report associated with the pre-defined search subject. A method for detecting personal experience event reports from user generated content on the Internet includes filtering a collection of Internet posts to include only Internet posts containing personal experience terms, and further filtering the filtered Internet posts by removing the Internet posts with non-personal experience terms.

8 Claims, 10 Drawing Sheets

I HAVE BEEN TAKING "DRUG A" FOR 4 YEARS AND HAVE EXPERIENCED A LOSS OF APPETITE. I ASKED MY DOCTOR IF IT WAS POSSIBLE THAT MY LOSS OF APPETITE WAS CAUSED BY TAKING "DRUG A" MY DOCTOR SAID NO BUT I HAVE READ THINGS TO THE CONTRARY. HAS ANYONE ELSE EXPERIENCED THIS?

FIG. 4

DRUG B IS THE CAUSE FOR LOW LIBIDO

YES {i ALSO HAD NO SEX DRIVE FOR ABOUT 2 MONTHS AFTER TAKING DRUG B}

| FACTOR | VALUE | WEIGHT | CONTRIBUTION |
|---|---|---|---|
| PROXIMITY_TRUE_DRUG_TRUE | 6.0 | −0.9 | −5.4 |
| PROXIMITY _TRUE_EXPERIENCE_FALSE | 0.0 | −2.0 | 0.0 |
| INBETWEEN_DRUG | 0.0 | −10.0 | 0.0 |
| INBETWEEN_CONCEPT | 0.0 | −2.0 | 0.0 |
| NUMBEROFCONCEPTS | 8.0 | 1.0 | 8.0 |
| DENSITY | 0.615 | 2.0 | 1.23 |
| EXISTENCE_TEMPORALITY PATTERN | 1.0 | 4.0 | 4.0 |
| NEGATED_SYMPTOM_FEATURE | 0.0 | −60.0 | 0.0 |
| SYMPTOM EXPERIENCE | 1.0 | 7.0 | 7.0 |
| PERSONDICTIONARYTYPEFEATURE | 0.0 | −30.0 | 0.0 |
| NEGATING FACTOR | 0.0 | −20.0 | 0.0 |

SCORE
−5.4+0+0+0+8+1.23+4+0+7+0+0=+14.83

FIG.7A

DRUG B IS NOT THE CAUSE FOR LOW LIBIDO

DEAR ANNY, {1 HEARD THAT DRUG B CAN CAUSE LOW SEX DRIVE}

| FACTOR | VALUE | WEIGHT | CONTRIBUTION |
|---|---|---|---|
| PROXIMITY_TRUE_DRUG_TRUE | 2.0 | −0.9 | −1.8 |
| PROXIMITY_TRUE_EXPERIENCE_FALSE | 0.0 | −2.0 | 0.0 |
| INBETWEEN_DRUG | 0.0 | −10.0 | 0.0 |
| INBETWEEN_CONCEPT | 0.0 | −2.0 | 0.0 |
| NUMBEROFCONCEPTS | 6.0 | 1.0 | 6.0 |
| DENSITY | 0.67 | 2.0 | 1.34 |
| EXISTENCE_TEMPORALITY PATTERN | 0.0 | 4.0 | 0.0 |
| NEGATED_SYMPTOM_FEATURE | 0.0 | −60.0 | 0.0 |
| SYMPTOM EXPERIENCE | 0.0 | 7.0 | 0.0 |
| PERSONDICTIONARYTYPEFEATURE | 0.0 | −30.0 | 0.0 |
| NEGATING FACTOR | 1.0 | −20.0 | −20.0 |

SCORE
−1.8+0+0+0+6+1.34+0+0+0+0−20=−14.46

FIG.7B

SYSTEM AND METHOD FOR DETECTING PERSONAL EXPERIENCE EVENT REPORTS FROM USER GENERATED INTERNET CONTENT

CROSS-REFERENCE TO RELATED APPLICATIONS

This application claims benefit from U.S. Provisional Patent Application No. 61/390,220, filed Oct. 6, 2010, and U.S. Provisional Patent Application No. 61/390,215 also filed Oct. 6, 2010 which are both hereby incorporated in their entirety by reference.

FIELD OF THE INVENTION

The present invention relates to Internet search engines generally and to customized search engines for user generated experience reports in particular.

BACKGROUND OF THE INVENTION

The Internet contains a plethora of reports that are at least somewhat related to consumer products and services. The sources for these reports are varied. For example, manufacturer/providers may provide information as part of their marketing efforts. Their competitors may provide conflicting information to promote competing products and services. Nominally disinterested parties provide independent reviews, although such reviews are often prejudiced by concerns not readily apparent to the reader. Such products and services are also often mentioned "by the way" as background for other subjects, making it difficult to weed out "true" reports from a multitude of "hits" received when using conventional Internet search engines.

The Internet also contains "forum" sites where users can post opinions and discuss various issues of interest. Some of the user posts on such sites constitute "personal experience" reports wherein consumers discuss their actual personal experiences using products and services. A typical such personal experience would be something like: "I used product X and my digestion improved immediately." In such manner, forum sites may provide valuable firsthand information from actual consumers of products and services.

Unfortunately, personal experience event reports are typically posted in free text with only nominal constraints on form or content, rendering them unstructured and difficult to identify by non-manual processes. It is therefore be difficult to identify and collate personal experience event reports using conventional Internet search engines, even when such search engines are configured to search forum sites.

SUMMARY OF THE PRESENT INVENTION

There is provided, in accordance with a preferred embodiment of the present invention, a method for retrieving Internet posts, implementable on a computing device, the method including:

analyzing Internet posts to define segments in the Internet posts, where the segments at least contain terms consistent with user generation of a personal experience event report associated with a pre-defined search subject, and scoring each of the segments, where the score indicates a likelihood that the Internet post associated with the segment represents a user generated the personal experience report associated with the pre-defined search subject.

Further, in accordance with a preferred embodiment of the present invention, the method also includes storing at least indications of the Internet posts with associated scores above a pre-defined threshold in a searchable personal experience database.

Still further, in accordance with a preferred embodiment of the present invention, the method also includes compiling a list of post collection websites, and collecting the Internet posts according to the list of websites for the analyzing on a periodic basis.

Additionally, in accordance with a preferred embodiment of the present invention, the compiling includes at least one of detecting "good" textual patterns indicative of an authentic user generated personal experience event report from a training set of authenticated the user generated personal experience event reports, and detecting "bad" textual patterns indicative of a non-authentic user generated personal experience event report from a training set of non-valid the user generated personal experience event reports.

Moreover, in accordance with a preferred embodiment of the present invention, the method also includes assigning weights to each of the "good" and "bad" textual patterns to reflect a likelihood of the user generated personal experience event reports including each of the "good" and "bad" textual patterns.

Further, in accordance with a preferred embodiment of the present invention, the method also includes assigning weights to predictive factors associated with the authentic and non-authentic user generated personal experience event reports in the training sets to reflect a likelihood of the user generated personal experience event reports being associated with at least some of the predictive factors, where the predictive factors include at least one of external website/page rankings and factors derived from the training sets.

Still further, in accordance with a preferred embodiment of the present invention, the external website/page rankings include at least one of Google website ranks, Google page ranks, query ranks, and Alexa ranks.

Additionally, in accordance with a preferred embodiment of the present invention, the derived factors include at least one of website metadata, number of images per page, number of links per page, ratio of authentic user generated personal experience event reports per discussion thread, number of authentic user generated personal experience event reports per website, total anchor terms detected and total terms detected.

Moreover, in accordance with a preferred embodiment of the present invention, the method also includes calculating a set of weighted indicators for assessing a likelihood that candidate websites have authentic user generated personal experience event reports, where the set of weighted indicators include at least the weighted good and bad textual patterns and the weighted predictive factors.

Further, in accordance with a preferred embodiment of the present invention, the method also includes identifying the candidate websites with Internet posts including terms from at least one of two "anchor" categories, where the anchor categories represent two essential components of the user generated personal experience reports, collecting at least a sample of the Internet posts from the identified candidate websites, and scoring each candidate website according to a cumulative weighted score as per the set of weighted indicators, where a pre-defined score threshold indicates a website with user generated personal experience event reports, and adding the website with user generated personal experience event reports to the list of post collection websites.

Still further, in accordance with a preferred embodiment of the present invention, the pre-defined subject is pharmaceuticals.

Additionally, in accordance with a preferred embodiment of the present invention, the anchor categories are a drug name and a symptom.

Moreover, in accordance with a preferred embodiment of the present invention, the analyzing also includes filtering the Internet posts to remove the Internet posts that do not at least contain the terms from each of a minimum number of term categories associated with the pre-defined subject, detecting a pair of anchors from two anchor categories, where the anchor categories are also term categories and represent two essential components of the user generated personal experience reports, and defining a basic segment as a shortest section of text between the pair of anchors, and when the shortest section of text does not include at least one the term from each of the minimum number of term categories, expanding the basic segment to extend beyond the shortest section of text to include at least one the term from each of the minimum number of term categories.

Further, in accordance with a preferred embodiment of the present invention, the method also includes calculating a density value for the terms in the basic segment, expanding the basic segment to include a nearest term not included in the basic segment, recalculating the density value for the expanded basic segment, iteratively repeating the expanding and recalculating until the recalculated density value is less than a previously calculated the density value and defining the expanded basic segment as a final segment.

Still further, in accordance with a preferred embodiment of the present invention, the calculating includes defining weights to be associated with each of the terms, where each defined weight reflects a value for an associated term as a predictor of the basic segment representing a user generated personal experience event report, and multiplying a ratio of the weighted terms, divided by an overall number of words in the basic segment.

Additionally, in accordance with a preferred embodiment of the present invention, the scoring includes defining a set of indicating factors, where each indicating factor is associated with a possible feature in the segments, where the possible features affect the likelihood that the Internet post associated with the segment represents a user generated the personal experience event report associated with the pre-defined search subject, and weighting the indicating factors in accordance with the likelihood, where each of the indicating factors is at least one of negative and positive.

Moreover, in accordance with a preferred embodiment of the present invention, the defining and weighting is at least in accordance with linear regression of a training set of Internet posts known to represent the user generated the personal experience event reports.

Further, in accordance with a preferred embodiment of the present invention, the defining and weighting is at least in accordance with linear regression of a training set of the Internet posts known not to represent the user generated the personal experience event reports.

Still further, in accordance with a preferred embodiment of the present invention, the method also includes multiplying a value for each of the indicating factors, and summing the products of the multiplying to determine a final score, where the final scores exceeding a pre-defined threshold score indicate user generated the personal experience event reports.

There is also provided, in accordance with a preferred embodiment of the present invention, an Internet post retrieval system, implementable on a computing device, including a segment analyzer module to define segments in the Internet posts, where the segments at least contain terms consistent with user generation of a personal experience event report associated with a pre-defined search subject, and a scoring engine to calculate a score for each the segment, where the score indicates a likelihood that the Internet post associated with the segment represents a user generated personal experience report associated with the pre-defined search subject.

Further, in accordance with a preferred embodiment of the present invention, the system 20 also includes a post collector to collect posts from a collection list of Internet websites.

Still further, in accordance with a preferred embodiment of the present invention, the system also includes a searchable personal experience database to store at least indications of the Internet posts with associated scores above a pre-defined threshold.

Additionally, in accordance with a preferred embodiment of the present invention, the segment analyzer includes a post filtering module to access a filter database of terms to filter out the Internet posts which do no not contain defined categories of the terms that are associated with the user generated personal experience event reports for the pre-defined search subject, an anchor detection module to access an anchor database to detect at least a pair of anchors in the Internet posts that pass through the post filtering module, where the pair of anchors represents one term from a name category associated with the pre-defined search subject, and one term from a second category associated with the pre-defined search subject, and a basic segmentation unit to define basic post segments, where the basic post segments contain at least the pair of anchors and expressions from additional categories of terms located in a term database.

Moreover, in accordance with a preferred embodiment of the present invention, the segment analyzer also includes a density calculator to calculate a cumulative density of the expressions in the basic post segments, where each of the expressions is weighted to indicate its contribution to the density, and a segment optimizer to expand the basic post segments in accordance with a maximum the cumulative density as calculated by the density calculator.

Further, in accordance with a preferred embodiment of the present invention, the scoring engine is configurable to calculate the score in accordance with a series of positively and negatively weighted factors associated with the search subject.

Still further, in accordance with a preferred embodiment of the present invention, the system also includes a website selection utility to generate a collection list of websites, where the websites are determined by the website selection utility to contain user generated personal experience event reports.

Additionally, in accordance with a preferred embodiment of the present invention, the utility includes a pattern recognizer to at least detect textual patterns associated with user generated personal experience event reports in a training set of "good" Internet posts, a training set scoring engine to calculate weighted indicators based on at least the detected textual patterns, and a candidate scoring engine to at least apply the weighted indicators to Internet posts from candidate websites to determine, for each of the candidate websites, if they contain user generated personal experience event reports.

There is also provided, in accordance with a preferred embodiment of the present invention, a method for compiling a list of Internet post collection websites, implementable on a computing device including detecting "good" textual patterns indicative of an authentic user generated personal experience event report from a training set of authenticated user generated personal experience event reports, and detecting "bad" textual patterns indicative of a non-authentic user generated personal experience event report from a training set of non-valid user generated personal experience event reports.

There is also provided, in accordance with a preferred embodiment of the present invention, a method for isolating segments from Internet posts, implementable on a computing device, including filtering the Internet posts to remove the Internet posts that do not at least contain terms from each of a minimum number of term categories that are associated with a user generated personal experience report associated with a pre-defined subject, detecting a pair of anchors from two anchor categories, where the anchor categories are among the term categories and represent two essential components of the user generated personal experience event reports, defining a basic the segment as a shortest section of text between the pair of anchors, and when the shortest section of text does not include at least one the term from each of the minimum number of term categories, expanding the basic segment to extend beyond the shortest section of text to include at least one the term from each of the minimum number of term categories.

There is also provided, in accordance with a preferred embodiment of the present invention, a method for scoring segments of Internet posts, implementable on a computing device, including defining a set of indicating factors, where each indicating factor is associated with a possible feature in the segments, where the possible features affect a likelihood that the Internet post associated with the segment represents a user generated the personal experience event report associated with a pre-defined search subject, and weighting the indicating factors in accordance with the likelihood, where each of the indicating factors is at least one of negative and positive.

There is also provided, in accordance with a preferred embodiment of the present invention, a method, implementable on a computing device, for detecting personal experience event reports from user generated content on the Internet, the method including filtering a collection of Internet posts to include only said Internet posts containing personal experience terms, and further filtering said filtered Internet posts by removing said Internet posts with non-personal experience terms.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an illustration of an exemplary Internet post to be analyzed and processed by the system of FIG. 1;

FIGS. 5-7B are illustrations of exemplary scoring tables to be used during the process of FIG. 3;

Figure 1:
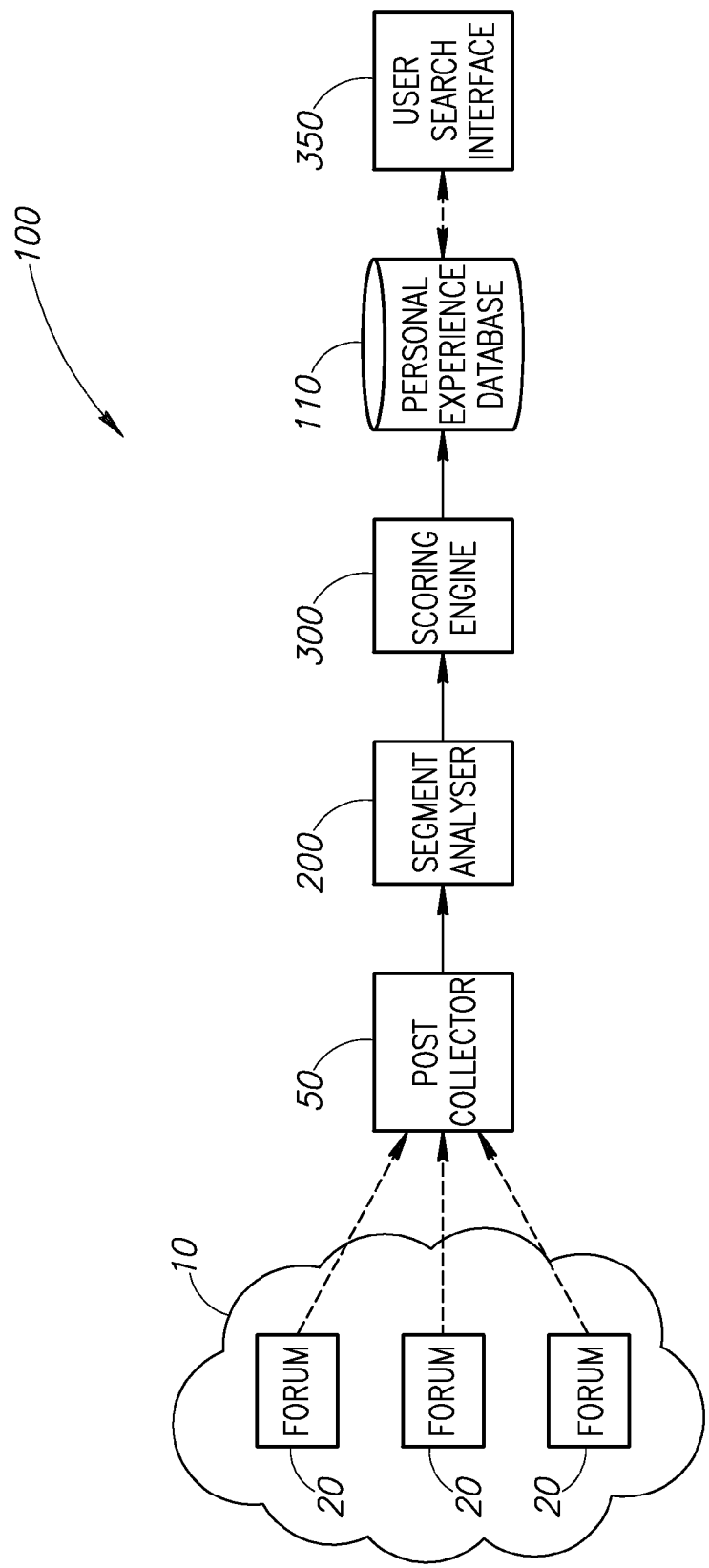
FIG. 1 is a block diagram of a novel user-generated personal experience retrieval system 100, designed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that currently available Internet search engines are inefficient tools for searching Internet forums for user generated personal experience event reports that may be used to evaluate and compare products and services. An Internet user generated personal experience event report may be a statement written by users on an Internet platform (such as a message board), referring to their own experience with regard to a specific product or service. A specialized search process may be configured to identify such reports related to a specific field of products and/or services in order to filter out "false hits" and extraneous information that may typically be retrieved by a search engine.

Reference is now made to FIG. 1 which illustrates a novel user-generated personal experience retrieval system 100, designed and operative in accordance with a preferred embodiment of the present invention. System 100 may comprise post collector 50 in communication with forums 20 on Internet 10. System 100 may also comprise segment analyzer 200, scoring engine 300 and user search interface 350.

In accordance with a preferred embodiment of the present invention, system 100 may be configured to identify user-generated personal experience event reports that may be related to pharmaceutical products. It will be appreciated that a typical subject for which there may be demand for collating and analyzing user-generated personal experience event reports may be pharmaceuticals. For example, potential users of pharmaceuticals may understandably wish to study personal experience event reports prior to beginning a treatment. To illustrate such an embodiment, system 100 and its methods of operation may therefore be described hereinbelow in the context of a pharmaceutical based configuration. However, it will be appreciated that the present invention may be configured for any suitable subject for which personal experience event reports may be posted on the Internet, for example, automobiles, airline travel, banking services, food and beverages, etc Post collector 50 may periodically collect posts from a "collection list" of chat forums 20 on Internet 10. The collected posts may be forwarded to segment analyzer 200 to identify segments of forum posts that may be likely to contain personal experience event reports regarding the subject for which system 100 may be configured. For example, segment analyzer may identify post segments that may be likely to contain personal experience event reports regarding the use of pharmaceuticals.

These segments may be forwarded to scoring engine 300 which may "score" the segments in terms of their likely relevance as personal reports. Scored segments may then be stored in personal experience database 110 along with addressing information, such as a uniform resource locator (URL) for the original post. Users may then use user search interface 350 to search database 110 for user-generated personal experience event reports regarding the products/services for which system 100 may be configured. For example, a user may search for event reports relating to "Drug A" in order to find out if anyone that had personally used Drug A had reported regarding its success and/or any side effects suffered when using it. The output of such a search may consist of a list of chat posts, sorted according to the score assigned by scoring engine 300. It will be appreciated that the present invention may include any suitable implementation for user search interface 350, such as, for example, a browser based utility for inputting search parameters and displaying links to related user generated personal experience event reports.

The collection list used by post collector 50 may include chat forums 20 deemed to be relevant to the subject for which system 100 may be configured. For example, if system 100 is configured for personal reports on pharmaceutical products, the collection list may include a list on chat forums 20 on which it may be likely that users may post personal experience event reports relating to their use of pharmaceutical products. It will be appreciated that post collector 50 may be configured with to include any suitable method such as known in the art for "scraping" forum posts from the collection list. It will similarly be appreciated that post collector 50 may be configured perform such "scraping" on an incremental basis to avoid reprocessing older posts.

As will be disclosed hereinbelow, the present invention may also include a novel pre-collection process for compiling the collection list for system 100. However, it will be appreciated that the present invention may include any suitable method for compiling the collection list, including manual inspection.

Figure 2:
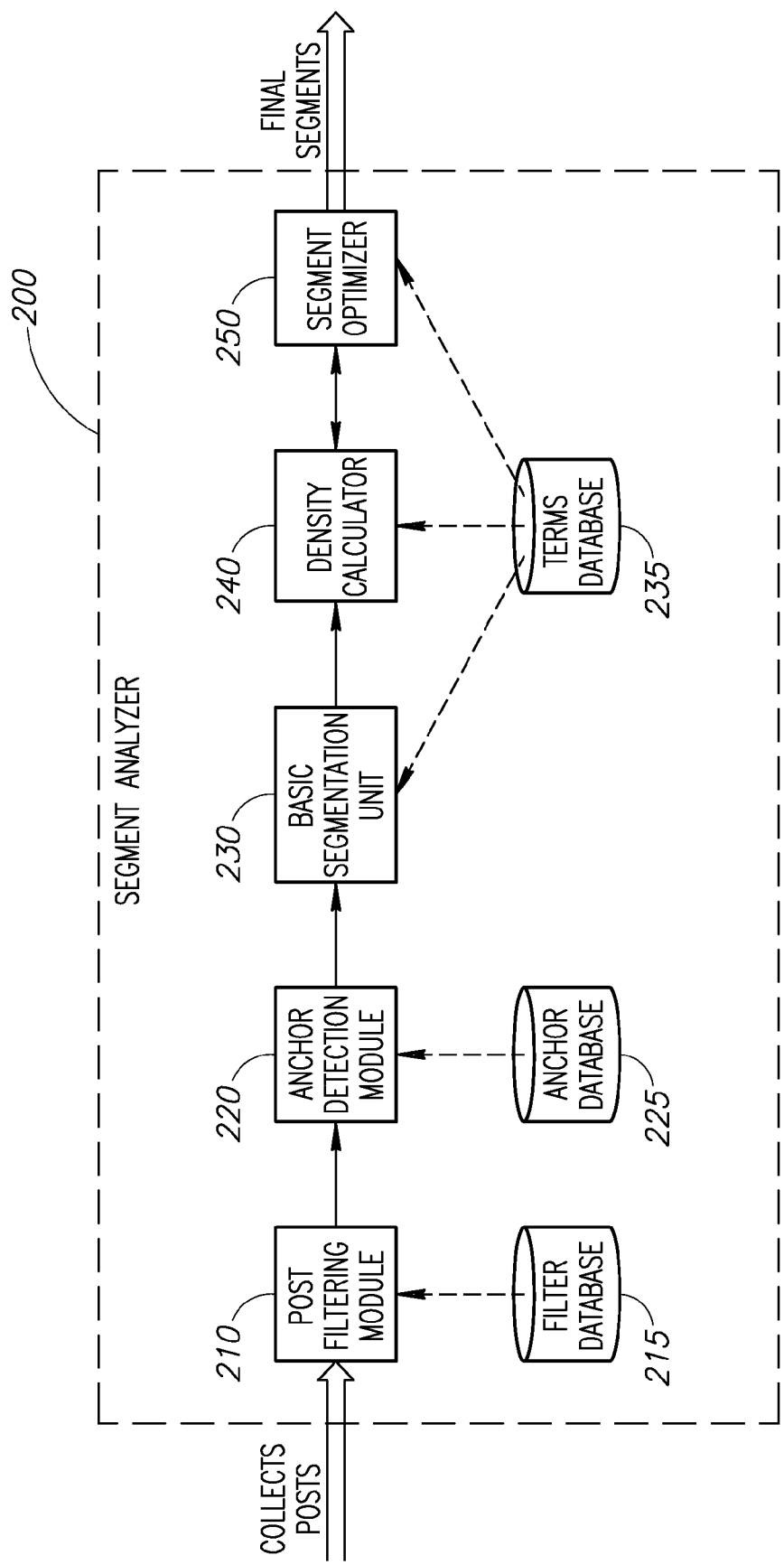
FIG. 2 is a block diagram of the segment analyzer of the embodiment of FIG. 1.

Reference is now made to FIG. 2 which illustrates segment analyzer 200 in greater detail. Segment analyzer 200 may comprise post filtering module 210, anchor detection module 220, basic segmentation unit 230, density calculator 240 and segment optimizer 250. Segment analyzer 200 may also comprise filter database 215, anchor database 225 and terms database 235, each of which may be referenced by the other elements of segment analyzer 200.

Figure 3:
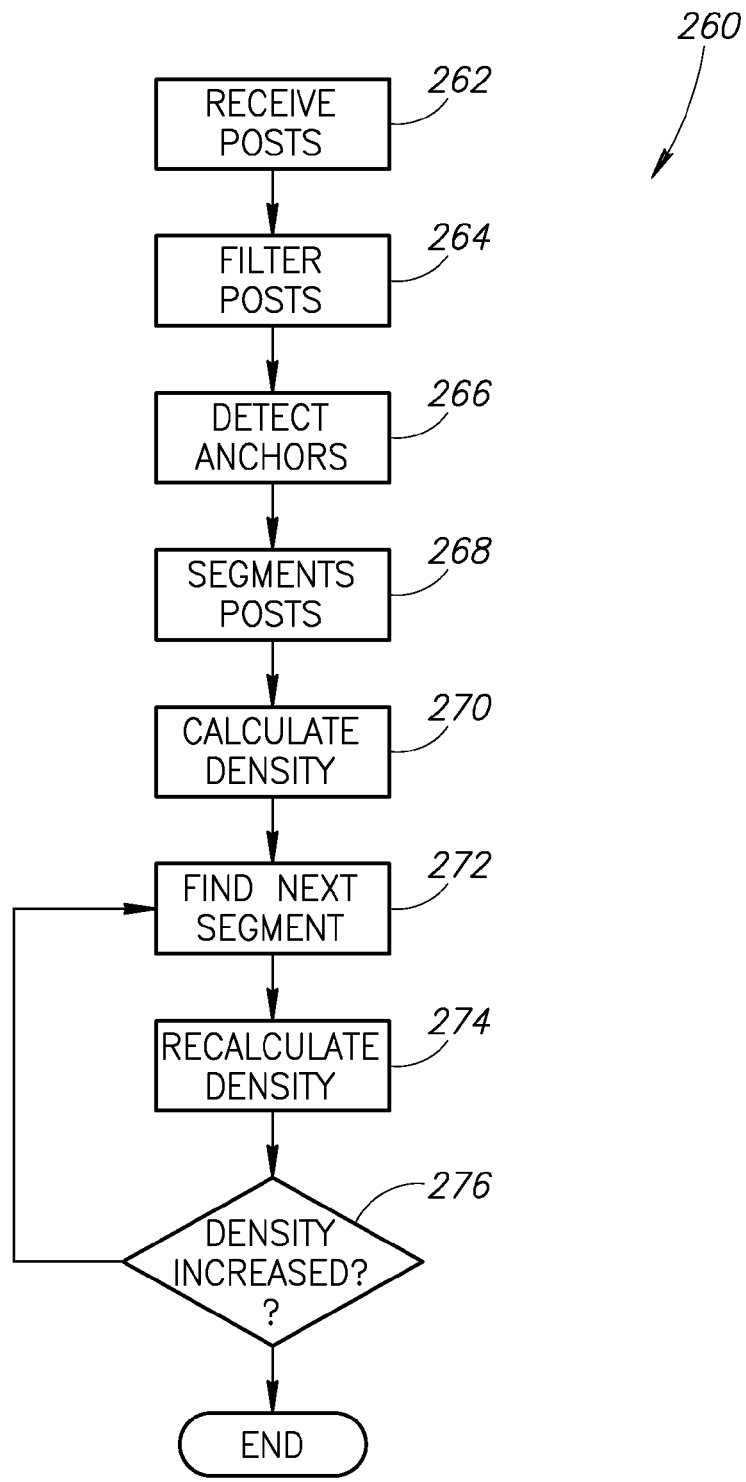
FIG. 3 is a block diagram of a novel process to be performed by the system of FIG. 1.

Reference is now also made to FIG. 3 which illustrates a novel post segmentation process 260 that may be executed by segment analyzer 200 to derive optimally segmented user-generated personal experience event reports from the posts collected by post collector 50.

Post filtering module 210 may receive (step 262) posts from post collector 50. Post filtering module 210 may filter (step 264) these posts according to terms found in filter database 215. Filter database 215 may store a list of categorized relevant terms which module 210 may search for in each post. Depending on the configuration of system 100, at least one term from a combination of some the categories must be found in a post for that post to pass through the step 264. The categories may include, for example, product/service name, indication of personal reference, and indication of personal experience. The product/service name category may consist of names of product/services regarding which a user of system 100 may wish to search for personal experience event reports. It will be appreciated that other configurations for system 100 are included in the present invention. For example, if system 100 is configured for automobile research, the terms in the product/services name category may include a list of automobile makes, manufacturers and nicknames, such as, for example: "Corvette", "Chevrolet", "Chevy", and "Vette". The category for indications of personal reference may include terms such as "I", "my", "me", "mine", "myself", etc. that may indicate that the post refers to an actual personal experience. The category for personal experience may include terms such as, for example, "I used", "I bought" "I had", etc. that may indicate that the poster had an actual personal experience; that the report was not based on hearsay or opinion. In accordance with a preferred embodiment of the present invention, a post may have to contain at least one term from each of these categories in order to pass through step 264.

It will be appreciated, however, that depending on the configuration of system 100 there may be other term categories in filter database 215. For example, if system 100 is configured for pharmaceuticals, the relevant terms may be divided into five categories: Drug name (i.e. product/service name), indication of personal reference, indication of personal drug experience, symptom, and personal symptom experience. Symptom terms may be precise medical terms, such as, for example, "headache", or alternatively they may also include user descriptions such as "my head exploded". Personal symptom experience terms may be indicative of the poster having a personal cause/reason for using the indicated drug, for example: "I suffered from", "I have experienced". In accordance with a preferred embodiment of the present invention, when system 100 may be configured for pharmaceuticals, terms from all five categories must be present in a post in order for it to pass through step 264. In accordance with an alternative preferred embodiment, post filtering module may be configured to require terms from only four categories, wherein a term from only one of the personal experience and personal symptom experience categories may be required. It will be appreciated that similar categories may be used to configure system 100 for non-pharmaceutical products and/or services. For example, if system 100 is configured for automobile research, the symptom category may be replaced by a "preference category" including terms such as "family car", "sports car", "road handling" or "seven seats". Similarly, the personal symptom experience category may be replaced by a personal preference category including terms such as "I need a bigger car", "I wanted a sports car" or "I value engine performance".

Anchor detection module 220 may detect (step 266) segment anchors in posts that contain all of the required term categories. Module 220 may reference database 225 for lists of segment anchor terms to match to terms in the posts. Segment anchors may represent a pair of term categories that may together define the personal experience event reports of interest for system 100. For example, in a pharmaceutical configuration, the segment anchors may be the drug name and symptom categories. Alternatively, the segment anchors may be the drug name and personal symptom experience categories. In accordance with a preferred embodiment of the present invention, segment anchors for a pharmaceutical configuration may be terms from the drug name and symptom categories. Database 225 may be populated by a publicly available database of drugs and symptoms.

Basic segmentation unit 230 may then segment (step 268) the posts based on the anchors identified in step 266 to find the minimal text segments in the post that have at least one term from each of the categories required for the filter process in step 264. Unit 230 may first search for the required terms between the identified anchors and may then incrementally search before and after the anchors one word at a time until at least one of the terms from all of the relevant categories may be identified in order to define basic segments.

Density calculator 240 may reference terms database 235 to calculate (step 270) the density of relevant terms in each basic segment. The density may be defined as the ratio of the relevant terms each multiplied by an associated weight stored in database 235, divided by the overall number of words in the basic segment. It will be appreciated that each term in database 235 may have a different defined weight that may reflect its value as a predictor of the likelihood that the post being analyzed may represent a user generated personal experience event report. Accordingly, the calculated density score may provide a measure of the amount of relevant information contained in the specified segment. It will be appreciated that any suitable method may be used to assign the weights. As will be described hereinbelow, in accordance with a preferred embodiment of the present invention, linear regressions may be run on a training set of data to derive these weights.

It will also be appreciated that some of the terms may have negative values. In addition to the terms in filter database 215, terms database 235 may also store other categories of terms that may also be used to assess the likelihood of a segment containing a valid user-generated personal experience event report. For example, terms database 235 may also store terms relating to a "negative" category. Terms such as "heard of", "likely", "I've been told", "did not" may typically impact negatively on the likelihood that a given report is a true personal experience, and may therefore be significant when assessing a given segment at the next step of the process. Depending on the configuration of system 100, other categories may be added as well. For example, in an exemplary configuration for pharmaceuticals, there may be an "outcome" or "result" category that may include terms such as "got better", "recovered" or "condition worsened". As in the embodiments described hereinabove, each term in such a category may be weighted to reflect its value as a predictor of the likelihood that the post being analyzed may represent a user generated personal experience event report.

Segment optimizer 250 may incrementally check each word before and after the segment to find (step 272) the next term from database 235. Density calculator 240 may then recalculate (step 274) the density as in step 270. If the result is that density has increased (step 276), segment optimizer may again find (step 272) the next term. Steps 272 and 274 may be repeated until the density ceases to increase (step 276) at which point the final, presumably optimized, segment may be output by segment analyzer 200.

Reference is now made to FIG. 4 which illustrates an exemplary post as analyzed by segment analyzer 200. Terms 282 and 284 may represent anchor terms, "symptom" and "drug name" respectively. Term 281 may represent a personal experience term, terms 288 may represent personal reference terms, and terms 289 may represent negative terms. It will be appreciated that there may be two sets of anchor terms 282 and 284. Segment analyzer may use density calculator 240 to compare the density of the two sets in order to define a basic segment 285. Segment analyzer 200 may use terms 282A and 284A to define basic segment 285 since they reflect a denser segment; they "enclose" personal experience term 281, whereas terms 282B and 284B are much farther away from term 281. As described hereinabove, segment analyzer 200 may optimize basic segment 285 by expanding it to include additional terms and recalculating density (steps 272 and 274). Accordingly, an exemplary optimal segment 290 may be defined by expanding basic segment 285 to include terms 287 and 288A as well. It will also be appreciated that the second and third sentences may contain several negative terms 289, which may decrease the likelihood that an optimal segment may be in found in those sentences.

Figure 5:

Reference is now made to FIG. 5 which illustrates an exemplary factor weight table 305, suitable for use with a pharmaceutical configuration of system 100. Scoring engine 300 may use such a table to "score" the optimized segments received from segment analyzer 200 in order to assess the likelihood that they may contain relevant user-generated personal experience event reports. Each factor 310 may represent a possible situation that may occur in a segment, and may be weighted to reflect the effect of such a situation on the likelihood that a post may indeed be a relevant user-generated personal experience event report. It will be appreciated that any suitable method may be used to assign the weights. As will be described hereinbelow, in accordance with a preferred embodiment of the present invention, linear regressions may be run on a training set of data to derive these weights.

For example, high concept density, i.e high density as calculated by density calculator 240, may likely indicate that a post may indeed be a relevant user-generated personal experience event report. On the other hand, the appearance of a second drug between the anchors may lessen this likelihood, and accordingly may be given a negative weight, for example: −5. The proximity of terms may also reflect on the likelihood that a post may indeed be a relevant user-generated personal experience event report. For example, the farther apart a drug or experience and an associated side effect term may be mentioned in the segment, the less likely that they represent a "true" personal experience event report for that drug. Accordingly, proximity factors may be assigned negative weights. It will be appreciated that the exemplary values in table 305 may be derived from statistical modeling of actual pharmaceutical related forum posts. However, the present invention may also include other feature-weight sets for both pharmaceutical and other configurations.

Figure 6:

FIG. 6, to which reference is now made, illustrates table 305 (now labeled 305') with exemplary values added based on an exemplary post segment. In order to score the post, scoring engine 300 may multiply each factor value per its associated weight, and then add the products for the final score. The score for these exemplary values would thus be computed as:

$$\text{Score}=23*(-2)+1*(-3)+0*(-5)+0*(-5)+9*1+0.34*2+0*4+1*(-10)+1*10+0*(-10)=-39.28$$

A negative score may indicate that the likelihood of a relevant report may be low. System 100 may be configured to store all posts with a score above a certain threshold in personal experience database 110.

FIGS. 7A and 7B, to which reference is now made, show the scoring for two exemplary post segments referring to "Drug B". FIG. 7A shows a score of +14.83, whereas FIG. 7B shows a score of −14.46. The salient differences between the two examples may be that the example in FIG. 7A has an explicit "symptom experience (i.e. "no sex drive") and lacks a negating factor; whereas the example in FIG. 7B has a negating factor ("heard") and lacks an explicit symptom experience ("can cause" which may indicate a lack of actual experience). Accordingly, the post from FIG. 7A may be determined to qualify as a user generated personal experience event report, whereas, the post from FIG. 7B may not. It will be appreciated that the threshold for qualification may be configurable.

Figure 8:
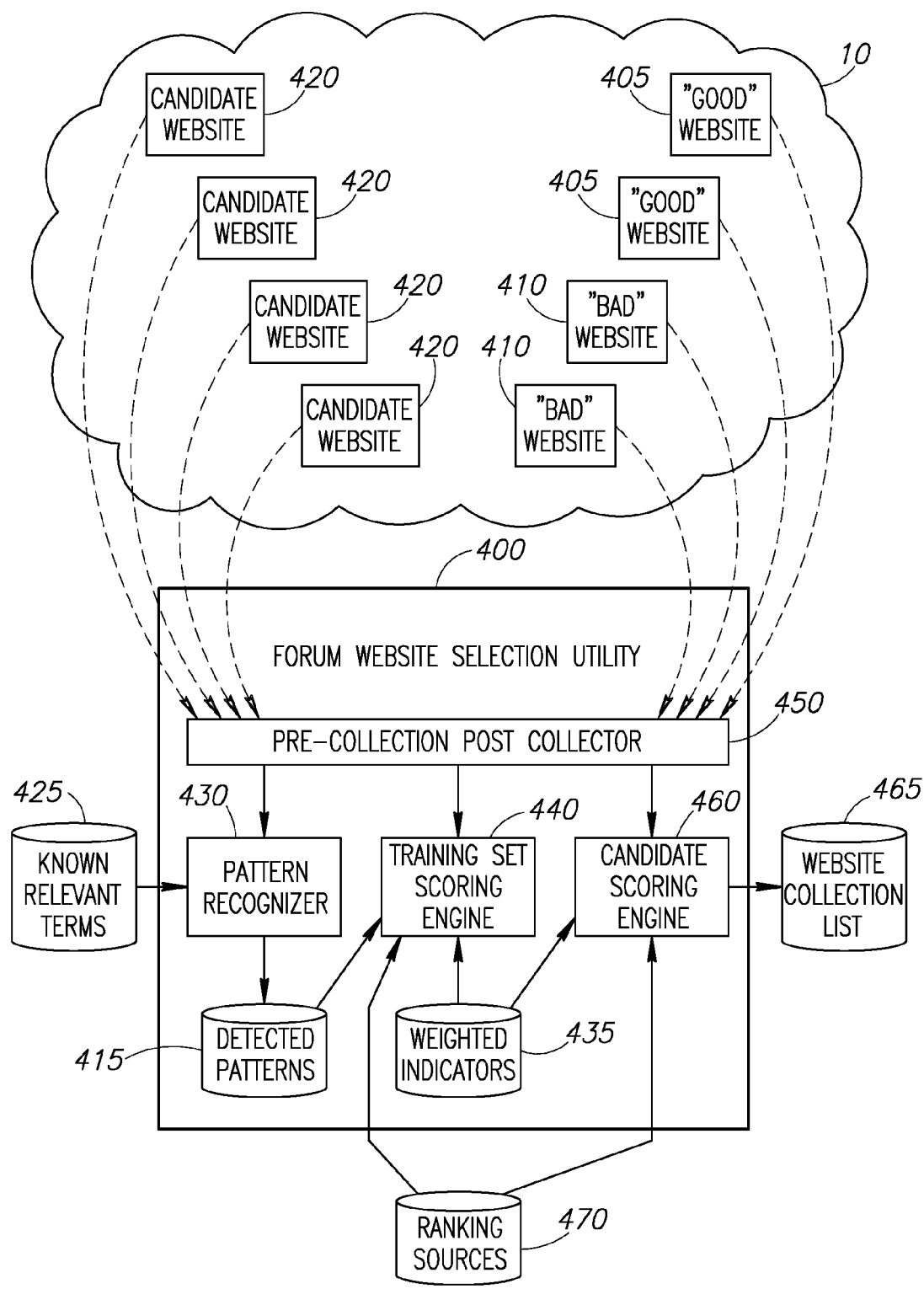
FIG. 8 is a schematic diagram of a novel forum website selection utility, constructed and operative in accordance with a preferred embodiment of the present invention.

It will be appreciated that it may not be possible to continuously perform comprehensive searches for user generated personal experience event reports from among all of the content available on the Internet. By necessity, the "collection list" referred to hereinabove may therefore represent only a small fraction of the websites on the Internet. In accordance with a preferred embodiment of the present invention, a forum website selection utility may be used to identify appropriate websites for collection by post collector 50, thus reducing the "universe" of websites for post collection to a manageable number of relevant websites with non-commercial/SPAM authentic user generated personal experience event reports. Reference is now made to FIG. 8 which illustrates forum website selection utility 400, constructed and operative in accordance with a preferred embodiment of the present invention.

Utility 400 may comprise pre-collection post collector 450, pattern recognizer 430, training set scoring engine 440 and candidate scoring engine 460. Utility 400 may communicate with Internet 10 via post collector 450, which may be configured with functionality for collecting posts from Internet websites similar to that of post collector 50. As may be described hereinbelow, pre-collection post collector 450 may collect Internet posts from training and candidate websites as part of a process to generate website collection list 465, whereas post collector 50 may collect posts from the websites in collection list 465.

Figure 9:
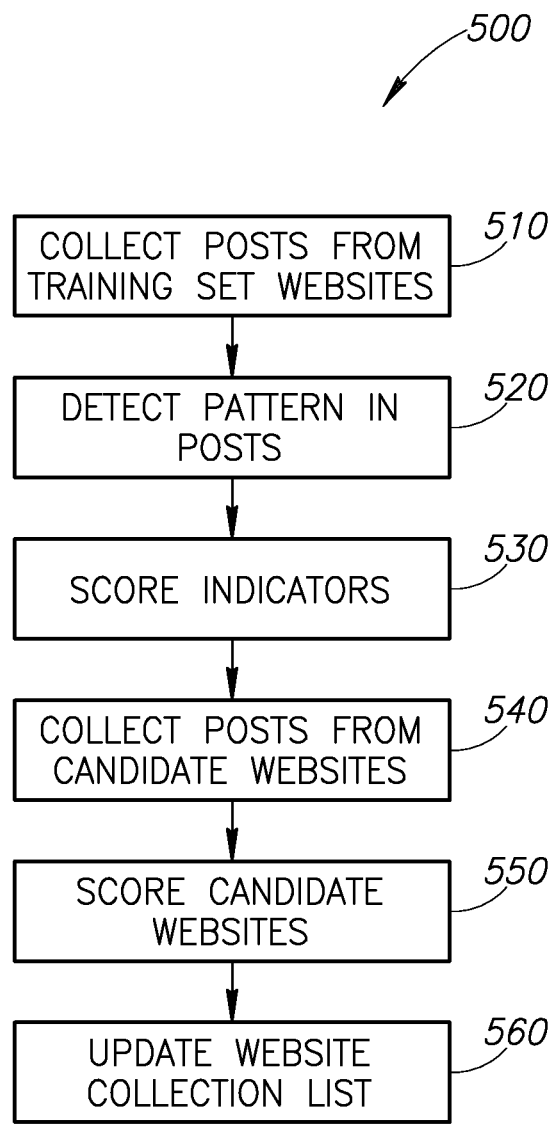
FIG. 9 is a block diagram of a novel process to be performed by the system of FIG. 8.

Reference is also made to FIG. 9 which illustrates a novel website selection process 500 to be performed by utility 400 in accordance with a preferred embodiment of the present invention. Pre-collection post collector 450 may collect (step 510) posts from a training set of websites that may include "good" websites 405 which may be known to have user generated personal experience event reports. In accordance with an alternative preferred embodiment of the present invention, the training set may also include "bad" websites 410, which may be known to have content related to the search subject (i.e. pharmaceuticals, cars, etc depending on the configuration of system 100) which may not qualify as user generated personal experience event reports.

"Good" websites 405 may be defined by any suitable method. For example, a generic search engine may be used to locate websites according to relevant keywords, and at least a subset of the website's content may be manually examined to determine whether or not the website includes user generated personal experience event reports. In accordance with a preferred embodiment of the present invention, the posts collected by pre-collection post collector 450 may be filtered to contain only verified authentic user generated personal experience event reports. The relevant keywords may be provided by an outside source such as known relevant terms database 425. For example, if system may be configured for pharmaceuticals, database 425 may be a publicly available database of medical terms that may include comprehensive lists of drugs and known symptoms. Similar methods may also be used to define "bad" websites.

Pattern recognizer 430 may detect (step 520) recurring patterns in the training set posts. It will be appreciated that any known, suitable methods for pattern detection/recognition may be used in the context of step 430. For example, such detection may include starting by searching for instances of terms from known relevant terms database 425. In accordance with a preferred embodiment of the present invention, database 425 may contain examples of at least one (and preferably both) of the anchor categories for which system 100 may be configured. For example, database 425 may contain a list of drugs and known symptoms. It will be appreciated that database 425 may provide the basis for anchor database 225.

Step 430 may also include detection of recurring terms that may not be found in database 425. For example, indications of personal reference/experience terms such as those in filter database 215 may also be detected. Exemplary such terms may include phrases such as: "I took" or "I felt better". In accordance with a preferred embodiment of the present invention, filter database 215 may be at least in part populated based on some or all of the terms detected in step 430.

It will be appreciated that some of the recurring terms detected by step 430 may be "negative" in nature. For example, terms such as "buy", "sale", "selling" may indicate an attempt to sell or market a product and that the post may therefore not be an authentic user generated personal experience event report. Such terms may typically be found in posts on bad websites 410.

It will be appreciated that step 520 may include detection of larger expressions as well. For example, a "moving window" may be used to check for recurring combination expressions including one or more of the anchor terms from database 425. For example, in the text: "this morning I took Drug A and less than an hour later my headache was gone," pattern recognizer 430 may initially detect anchors "Drug A" (drug name) and "headache (symptom). By incrementally employing a moving window to detect combination expression around these anchors, pattern recognizer may also detect larger expressions such as personal experience term "I took" in juxtaposition to anchor term "Drug A", and a variant on the initial symptom term, "headache was gone". Pattern recognizer 430 may be configured do perform statistical analysis on the terms detected in step 520 to track their occurrences and determine their significance.

It will be appreciated that utility 400 may be configured to facilitate inspection of the results of step 520 by a user of system 100, and to enable the user to adjust the input data as necessary to achieve a truer result. Accordingly, step 520 may be repeated as necessary. The patterns detected by pattern recognizer 430 may be stored in detected patterns database 415.

Training set scoring engine 440 may score (step 530) the terms in detected patterns database 415 to produce weighted indicators of the likelihood that a given website may or may not contain user generated personal experience event reports. Such scoring may employ any suitable method. For example, engine 440 may run a linear regression on the terms in detect patterns database 415 vis-à-vis the training set of posts from "good" and "bad" websites to determine the weight of each term as an indicator of likelihood that a given website is either "good" or "bad".

In accordance with a preferred embodiment of the present invention, engine 440 may expand the scoring process to also include other indicators from ranking sources database 470. Database 470 may represent rankings from external sources such as, for example, Google page ranks and/or Alexa ratings. Engine 440 may include the associated rankings for the page on which each post may be located as additional factors when running the linear regression on the terms in detect patterns database 415.

In accordance with a preferred embodiment of the present invention, engine 440 may expand the scoring process to also include additional factors that may be calculated or derived from the original posts. Such additional factors may include, for example, the query rank of the original query that identified the post as a candidate and meta keywords of the page.

In accordance with a preferred embodiment of the present invention, engine 440 may expand the scoring process to also include the number of images and/or links on the page. It will be appreciated that most user forums have relatively few images and links per page. Accordingly, a higher number of links or images per page may tend to indicate a "bad" website.

In accordance with a preferred embodiment of the present invention, engine 440 may also expand the scoring process to also include statistical data from cumulative scoring. Such factors may include, for example, the ratio of posts to the number of discussion (aka "threads"); or the overall ranking of a given anchor and/or term in "good" and "bad" websites. For example, the anchor term "Aspirin" may have an overall high ranking in "good" posts; statistically, personal experience event reports citing Aspirin may typically be genuine. However, the anchor term "Viagra" may typically be indicative of SPAM or commercial posts.

It will be appreciated that utility 400 may be configured to facilitate inspection of the results of step 530 by a user of system 100, and to enable the user to adjust the input data as necessary to achieve a truer result. Accordingly, step 530 may be repeated as necessary. The patterns scored by engine 440 may be stored in weighted indicators database 435. It will be appreciated that weighted indicators database 435 may therefore contain a superset (including calculated weights) of the terms in detected patterns database 415 and known relevant terms 425. It will also be appreciated that database 435 may provide the basis for terms database 235.

Pre-collection post collector 450 may collect (step 540) posts from candidate websites 420 on the Internet by formulating search queries based on positive term based indicators from weighted indicators database 435. Candidate scoring engine 460 may then score (step 550) each website 420 vis-à-vis all of the factors in weighted indicators database 435 to assess its likelihood to contain user generated personal experience event reports. System 100 may be configured with a threshold weighted score to determine whether or not a given website 420 may be considered likely to contain user generated personal experience event reports.

Utility 400 may update (step 560) website collection list 465 to include websites 420 that exceed such a threshold. It will be appreciated that process 500 may be performed on a periodic basis to continually update list 465. Accordingly, utility 400 may also record websites 420 with weighted scores below the threshold to avoid examining them again in the future.

It will be appreciated that website collection list 465 may be used by post collector 50 in the embodiment of FIG. 1.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method, implementable on a computing device, for detecting personal experience event reports from user generated content on the Internet, the method comprising:

filtering a collection of Internet posts to include only said Internet posts containing personal experience terms;

further filtering said filtered Internet posts by removing said Internet posts with non-personal experience terms;

analyzing said Internet posts to define segments in said Internet posts, wherein said segments at least contain terms consistent with user generation of a personal experience event report associated with a pre-defined search subject;

scoring each of said segments, wherein said score indicates a likelihood that said Internet post associated with said segment represents a user generated said personal experience report associated with said pre-defined search subject; and storing at least indications of said Internet posts with associated said scores above a pre-defined threshold in a searchable personal experience database;

and wherein said analyzing also comprises:

filtering said Internet posts to remove said Internet posts that do not at least contain said terms from each of a minimum number of term categories associated with said pre-defined subject;

detecting a pair of anchors from two anchor categories, wherein said anchor categories are also term categories and represent two essential components of said user generated personal experience reports;

defining a basic said segment as a shortest section of text between said pair of anchors;

when said shortest section of text does not include at least one said term from each of said minimum number of term categories, expanding said basic segment to extend beyond said shortest section of text to include at least one said term from each of said minimum number of term categories;

calculating a density value for said terms in said basic segment;

expanding said basic segment to include a nearest said term not included in said basic segment;

recalculating said density value for said expanded basic segment;

iteratively repeating said expanding and recalculating until said recalculated density value is less than a previously calculated said density value; and defining said expanded basic segment as a final segment.

2. A method, implementable on a computing device, for detecting personal experience event reports from user generated content on the Internet, the method comprising:

filtering a collection of Internet posts to include only said Internet posts containing personal experience terms; and further filtering said filtered Internet posts by removing said Internet posts with non-personal experience terms;

analyzing said Internet posts to define segments in said Internet posts, wherein said segments at least contain terms consistent with user generation of a personal experience event report associated with a pre-defined search subject;

scoring each of said segments, wherein said score indicates a likelihood that said Internet post associated with said segment represents a user generated said personal experience report associated with said pre-defined search subject; and storing at least indications of said Internet posts with associated said scores above a pre-defined threshold in a searchable personal experience database;

and wherein said scoring comprises:

defining a set of indicating factors, wherein each said indicating factor is associated with a possible feature in said segments, wherein said possible features affects said likelihood that said Internet post associated with said segment represents a user generated said personal experience event report associated with said pre-defined search subject; and weighting said indicating factors in accordance with said likelihood, wherein each of said indicating factors is at least one of negative and positive;

and wherein said defining and weighting is at least in accordance with linear regression of a training set of said Internet posts known to represent said user generated said personal experience event reports;

and wherein said analyzing further comprises:

filtering said Internet posts to remove said Internet posts that do not at least contain terms from each of a minimum number of term categories that are associated with a user generated personal experience report associated with a pre-defined subject;

detecting a pair of anchors from two anchor categories, wherein said anchor categories are among said term categories and represent two essential components of said user generated personal experience event reports;

defining a basic said segment as a shortest section of text between said pair of anchors;

when said shortest section of text does not include at least one said term from each of said minimum number of term categories, expanding said basic segment to extend beyond said shortest section of text to include at least one said term from each of said minimum number of term categories;

calculating a density value for said terms in said basic segment;

expanding said basic segment to include a nearest said term not included in said basic segment;

recalculating said density value for said expanded basic segment;

iteratively repeating said expanding and recalculating until said recalculated density value is less than a previously calculated said density value; and defining said expanded basic segment as a final segment.

3. A method, implementable on a computing device, for detecting personal experience event reports from user generated content on the Internet, the method comprising:

filtering a collection of Internet posts to include only said Internet posts containing personal experience terms;

further filtering said filtered Internet posts by removing said Internet posts with non-personal experience terms;

analyzing said Internet posts to define segments in said Internet posts, wherein said segments at least contain terms consistent with user generation of a personal experience event report associated with a pre-defined search subject;

scoring each of said segments, wherein said score indicates a likelihood that said Internet post associated with said segment represents a user generated said personal experience report associated with said pre-defined search subject; and storing at least indications of said Internet posts with associated said scores above a pre-defined threshold in a searchable personal experience database;

and wherein said scoring comprises:

defining a set of indicating factors, wherein each said indicating factor is associated with a possible feature in said segments, wherein said possible features affects said likelihood that said Internet post associated with said segment represents a user generated said personal experience event report associated with said pre-defined search subject; and weighting said indicating factors in accordance with said likelihood, wherein each of said indicating factors is at least one of negative and positive;

and wherein said defining and weighting is at least in accordance with linear regression of a training set of said Internet posts known not to represent said user generated said personal experience event reports;

and wherein said analyzing further comprises:

filtering said Internet posts to remove said Internet posts that do not at least contain terms from each of a minimum number of term categories that are associated with a user generated personal experience report associated with a pre-defined subject;

detecting a pair of anchors from two anchor categories, wherein said anchor categories are among said term categories and represent two essential components of said user generated personal experience event reports;

defining a basic said segment as a shortest section of text between said pair of anchors;

when said shortest section of text does not include at least one said term from each of said minimum number of term categories, expanding said basic segment to extend beyond said shortest section of text to include at least one said term from each of said minimum number of term categories;

calculating a density value for said terms in said basic segment;

expanding said basic segment to include a nearest said term not included in said basic segment;

recalculating said density value for said expanded basic segment;

iteratively repeating said expanding and recalculating until said recalculated density value is less than a previously calculated said density value; and defining said expanded basic segment as a final segment.

4. An Internet post retrieval system, implementable on a computing device, comprising:
- a segment analyzer module to define segments in said Internet posts, wherein said segments at least contain terms consistent with user generation of a personal experience event report associated with a pre-defined search subject;
- a scoring engine to calculate a score for each said segment, wherein said score indicates a likelihood that said Internet post associated with said segment represents a user generated said personal experience report associated with said pre-defined search subject; and
- a website selection utility to generate a collection list of websites, wherein said websites are determined by said website selection utility to contain user generated personal experience event reports;
- and wherein said utility comprises:
  - a pattern recognizer to at least detect textual patterns associated with said user generated personal experience event reports in a training set of "good" said Internet posts;
  - a training set scoring engine to calculate weighted indicators based on at least said detected textual patterns; and
  - a candidate scoring engine to at least apply said weighted indicators to Internet posts from candidate websites to determine, for each of said candidate websites, if they contain said user generated personal experience event reports;
- and wherein said segment analyzer:
- filters said Internet posts to remove said Internet posts that do not at least contain terms from each of a minimum number of term categories that are associated with a user generated personal experience report associated with a pre-defined subject;
- detects a pair of anchors from two anchor categories, wherein said anchor categories are among said term categories and represent two essential components of said user generated personal experience event reports;
- defines a basic said segment as a shortest section of text between said pair of anchors;
- when said shortest section of text does not include at least one said term from each of said minimum number of term categories, expanding said basic segment to extend beyond said shortest section of text to include at least one said term from each of said minimum number of term categories;
- said analyzer further:
- calculates a density value for said terms in said basic segment;
- expands said basic segment to include a nearest said term not included in said basic segment;
- recalculates said density value for said expanded basic segment;
- iteratively repeats said expanding and recalculating until said recalculated density value is less than a previously calculated said density value; and
- defines said expanded basic segment as a final segment.

5. A method for isolating segments from Internet posts, implementable on a computing device, comprising:
- filtering said Internet posts to remove said Internet posts that do not at least contain terms from each of a minimum number of term categories that are associated with a user generated personal experience report associated with a pre-defined subject;
- detecting a pair of anchors from two anchor categories, wherein said anchor categories are among said term categories and represent two essential components of said user generated personal experience event reports;
- defining a basic said segment as a shortest section of text between said pair of anchors;
- when said shortest section of text does not include at least one said term from each of said minimum number of term categories, expanding said basic segment to extend beyond said shortest section of text to include at least one said term from each of said minimum number of term categories;
- calculating a density value for said terms in said basic segment;
- expanding said basic segment to include a nearest said term not included in said basic segment;
- recalculating said density value for said expanded basic segment;
- iteratively repeating said expanding and recalculating until said recalculated density value is less than a previously calculated said density value; and
- defining said expanded basic segment as a final segment.

6. The method according to claim 5 and wherein said calculating comprises:
- defining weights to be associated with each of said terms, wherein each defined weight reflects a value for an associated said term as a predictor of said basic segment representing a user generated personal experience event report; and
- multiplying a ratio of said weighted terms, divided by an overall number of words in said basic segment.

7. A method for scoring segments of Internet posts, implementable on a computing device, comprises:
- defining a set of indicating factors, wherein each said indicating factor is associated with a possible feature in said segments, wherein said possible features affect a likelihood that said Internet post associated with said segment represents a user generated said personal experience event report associated with a pre-defined search subject;
- weighting said indicating factors in accordance with said likelihood, wherein each of said indicating factors is at least one of negative and positive;
  - and wherein said defining and weighting is at least in accordance with linear regression of a training set of said Internet posts known to represent said user generated said personal experience event reports;
- and wherein the method further comprises:
- filtering said Internet posts to remove said Internet posts that do not at least contain terms from each of a minimum number of term categories that are associated with a user generated personal experience report associated with a pre-defined subject;
- detecting a pair of anchors from two anchor categories, wherein said anchor categories are among said term categories and represent two essential components of said user generated personal experience event reports;
- defining a basic said segment as a shortest section of text between said pair of anchors;
- when said shortest section of text does not include at least one said term from each of said minimum number of term categories, expanding said basic segment to extend beyond said shortest section of text to include at least one said term from each of said minimum number of term categories;
- calculating a density value for said terms in said basic segment;

expanding said basic segment to include a nearest said term not included in said basic segment;

recalculating said density value for said expanded basic segment;

iteratively repeating said expanding and recalculating until said recalculated density value is less than a previously calculated said density value; and defining said expanded basic segment as a final segment.

8. A method for scoring segments of Internet posts, implementable on a computing device, comprises:

defining a set of indicating factors, wherein each said indicating factor is associated with a possible feature in said segments, wherein said possible features affect a likelihood that said Internet post associated with said segment represents a user generated said personal experience event report associated with a pre-defined search subject;

weighting said indicating factors in accordance with said likelihood, wherein each of said indicating factors is at least one of negative and positive;

and wherein said defining and weighting is at least in accordance with linear regression of a training set of said Internet posts known not to represent said user generated said personal experience event reports;

and wherein the method further comprises:

filtering said Internet posts to remove said Internet posts that do not at least contain terms from each of a minimum number of term categories that are associated with a user generated personal experience report associated with a pre-defined subject;

detecting a pair of anchors from two anchor categories, wherein said anchor categories are among said term categories and represent two essential components of said user generated personal experience event reports;

defining a basic said segment as a shortest section of text between said pair of anchors;

when said shortest section of text does not include at least one said term from each of said minimum number of term categories, expanding said basic segment to extend beyond said shortest section of text to include at least one said term from each of said minimum number of term categories;

calculating a density value for said terms in said basic segment;

expanding said basic segment to include a nearest said term not included in said basic segment;

recalculating said density value for said expanded basic segment;

iteratively repeating said expanding and recalculating until said recalculated density value is less than a previously calculated said density value; and defining said expanded basic segment as a final segment.

* * * * *